July 5, 1966     R. L. CANON     3,259,422
SLEEPER UNIT FOR STATION WAGONS AND THE LIKE
Filed Oct. 8, 1964     2 Sheets-Sheet 1
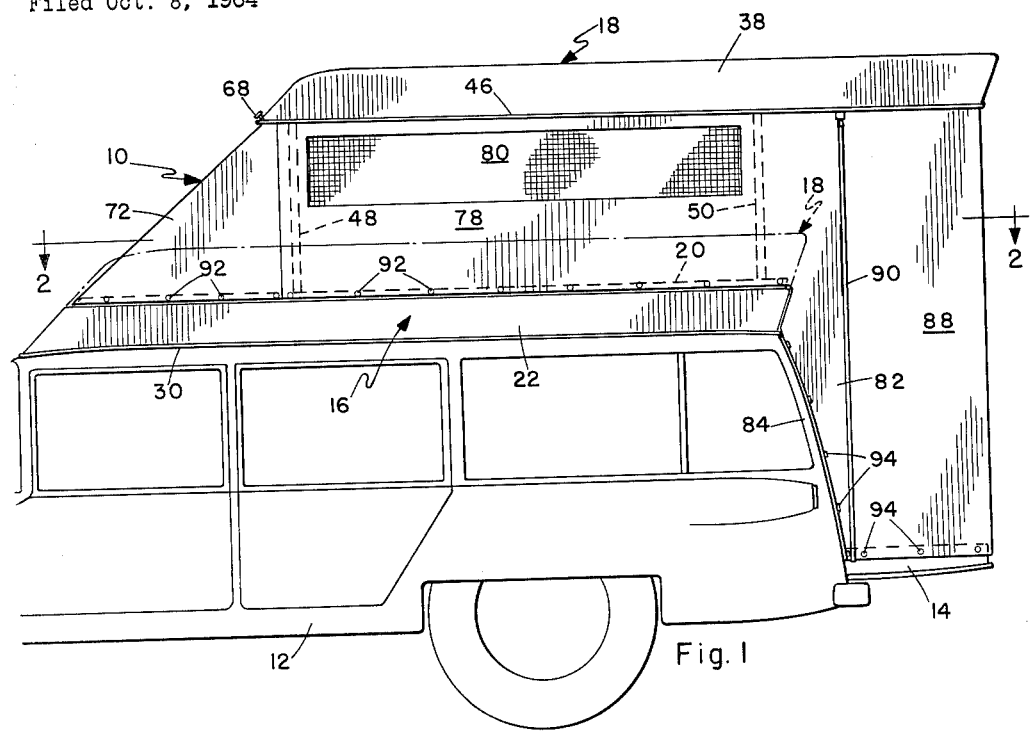
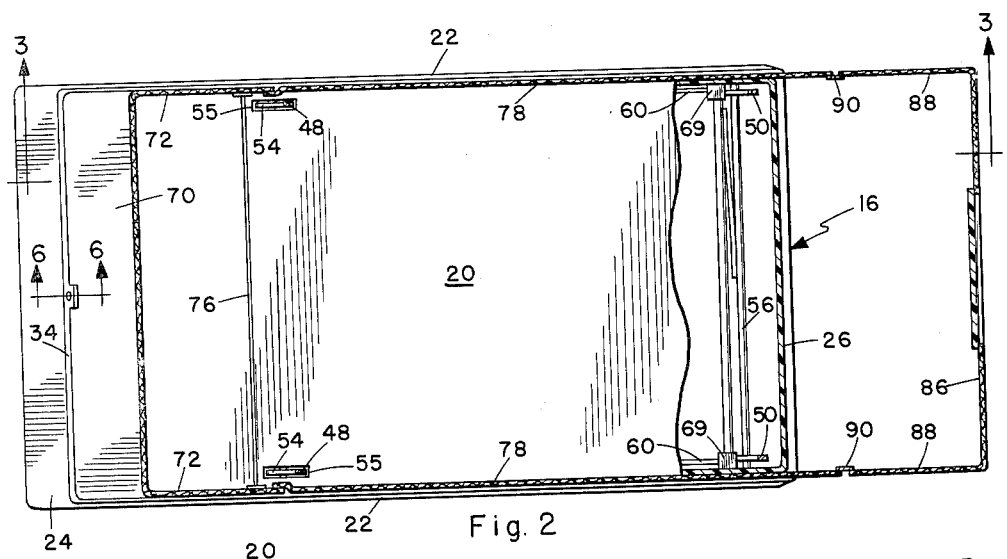
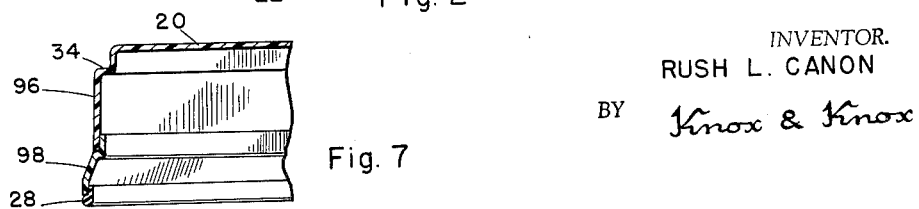
INVENTOR.
RUSH L. CANON
BY Knox & Knox July 5, 1966 R. L. CANON 3,259,422
SLEEPER UNIT FOR STATION WAGONS AND THE LIKE
Filed Oct. 8, 1964 2 Sheets-Sheet 2
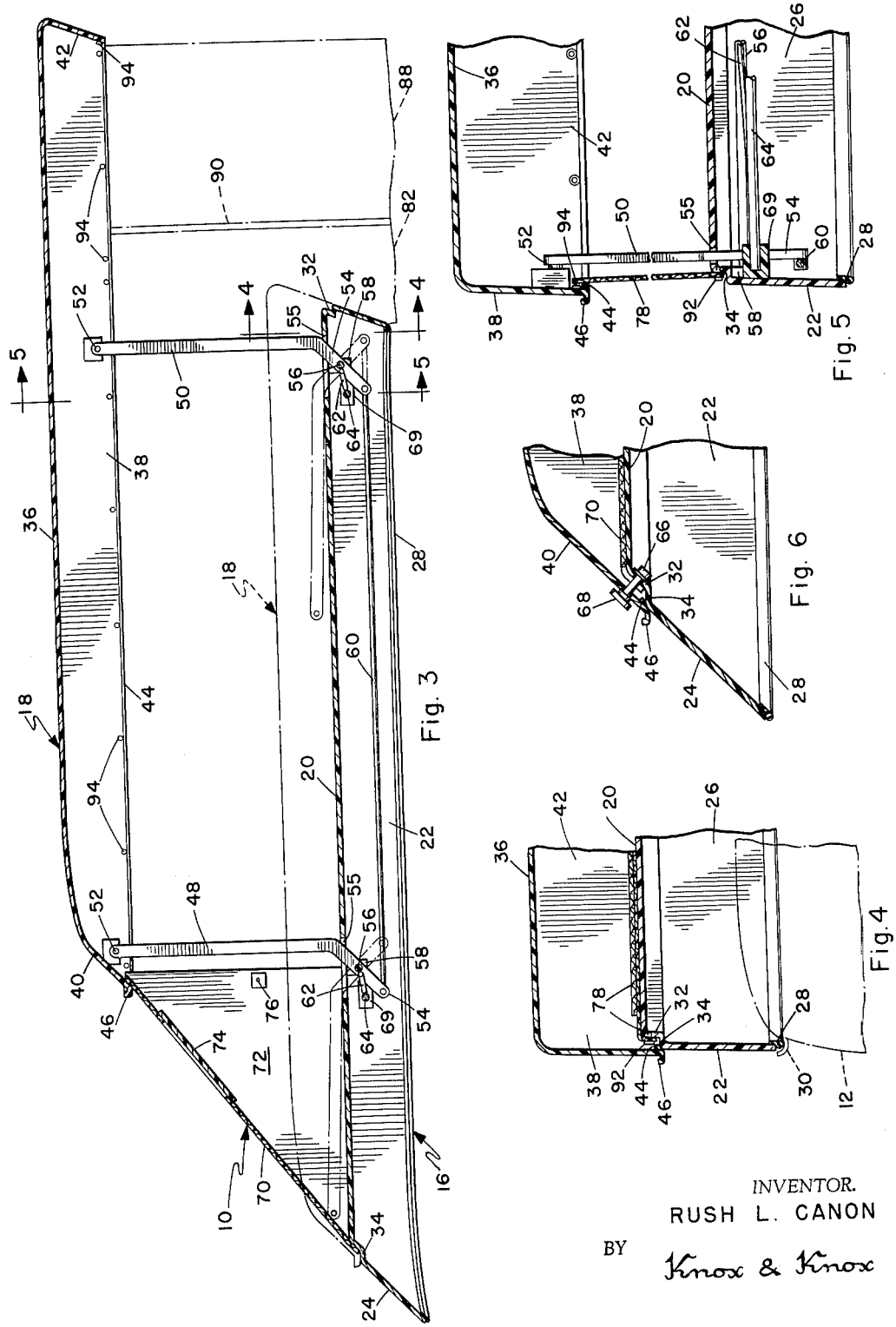
INVENTOR.
RUSH L. CANON
BY Knox & Knox

UNITED STATES PATENT OFFICE 3,259,422
Patented July 5, 1966

3,259,422
SLEEPER UNIT FOR STATION WAGONS
AND THE LIKE
Rush L. Canon, 3445 Dickens St., San Diego, Calif.
Filed Oct. 8, 1964, Ser. No. 402,498
9 Claims. (Cl. 296—23)

The present invention relates to vehicles and more particularly to a sleeper unit for station wagons and similar vehicles.

Many different types of sleeper or camper units have been devised for attachment to vehicle tops. Some hinge at one end and provide a tapered enclosure, or have a top which must be lifted and held by corner posts. Others use a vertically lifting scissors mechanism which is difficult to raise and many are merely fabric covers over a light structure. Most of these units are necessarily small to fit on a vehicle roof, or have a large overhang, and usually detract from the appearance of the vehicle.

The primary object of this invention is to provide a sleeper unit, particularly for a station wagon type vehicle, which utilizes the entire roof area of the vehicle and blends into the design in an attractive manner, the unit having a rigid roof which opens and is self-erecting with one easy motion.

Another object of this invention is to provide a sleeper unit which, by its manner of opening, extends the roof over the rear of a station wagon so that the tailgate can be lowered to cooperate with the roof and side enclosures to form a rear compartment with full head room and access to both the sleeper and the interior of the vehicle.

Another object of this invention is to provide a sleeper unit which is entirely self-contained, with no separable structural parts, and which can be erected, fully enclosed ready for use, in a few minutes.

In the drawings:
FIGURE 1 is a side elevation view of the sleeper unit on a vehicle;
FIGURE 2 is a sectional view taken on line 2—2 of FIGURE 1;
FIGURE 3 is an enlarged sectional view taken on line 3—3 of FIGURE 2;
FIGURE 4 is an enlarged fragmentary sectional view taken on line 4—4 of FIGURE 3;
FIGURE 5 is an enlarged fragmentary sectional view taken on line 5—5 of FIGURE 3;
FIGURE 6 is an enlarged fragmentary sectional view taken on line 6—6 of FIGURE 2; and
FIGURE 7 is a fragmentary sectional view similar to a portion of FIGURE 4, showing a base adapter for different vehicles.

Similar characters of reference indicate similar or identical elements and portions throughout the specification and throughout the views of the drawing.

The sleeper unit 10 is adaptable to various types of vehicles, but is most effective when used on a station wagon 12, or similar vehicle, having a tailgate 14 which can be lowered to provide a rear platform, as in FIGURE 1. The unit 10 comprises a base 16 and a roof 18, the base being a box-like structure with a floor 20 and downwardly extending side walls 22, front wall 24 and rear wall 26. The lower edge of the walls is contoured to fit closely on the roof of the vehicle and support the entire unit, the edge having a peripheral sealing strip 28 to seat against the vehicle. As illustrated, the base 16 is seated in the existing rain gutter 30 extending around the vehicle roof, but the exact position of the sleeper unit might vary with different vehicles. The upper edge of the base 16 has a peripheral inset portion 32 forming a shoulder 34. Base 16 can be secured to the vehicle in any suitable manner, as by straps or clips used with roof mounted luggage racks, or by more permanent attachment directly to the vehicle roof. If the vehicle is fitted with an integral luggage rack, which cannot easily be removed, the base 16 has internal clearance to cover such a rack and may even be secured to the rack.

The roof 18 is a box-like structure with a top panel 36 and downwardly extending side walls 38, front wall 40 and rear wall 42. The lower edge of the walls is fitted with a peripheral sealing strip 44, which seats on the shoulder 34 of base 16 and seals the unit when closed, said lower edge also having an upturned peripheral rain gutter 46 to prevent seepage into the joint and to provide drainage when the unit is in use.

Base 16 and roof 18 are shaped to conform to the general configuration of the vehicle, the front wall portions being rearwardly inclined to follow the windshield line, which reduces wind resistance and also simplifies the opening and closing action. Since the unit is substantially the full length of the vehicle roof, the contours can readily be made to appear as an integral part of the vehicle design and avoid the undesirable effect of a box tied to the top of the vehicle. Various materials may be used for the basic structure, glass fiber reinforced plastic being particularly suitable.

The base and roof are connected by two pairs of support struts, one pair of struts 48 at the front and the other pair of struts 50 at the rear, the upper ends of the struts being attached inside the side walls 38 by hinges 52. The lower ends of struts 48 and 50 each have an angularly disposed leg 54 which passes through a slot 55 in the floor 20, each pair of legs being fixed to a cross bar 56 journalled between bearings 58 on the side walls 22. At each side the lower ends of legs 54 are interconnected from front to rear by connecting rods 60, so that all four support struts 48 and 50 swing together. The angle of each leg 54 relative to its support strut is such that, in the lowered or closed position indicated in broken line in FIGURE 3, the struts lie along the top of floor 20 and do not require recesses in the floor. To assist in raising the roof 18, each cross bar 56 is connected by a torsion rod 62 to an adjacent fixed anchor bar 64, the torsion rods being secured with torque stress to swing the support struts upwardly and rearwardly. Other biasing arrangements may be used, such as springs coupled to the connecting rods 60, the particular arrangement depending on the weight of the roof to be lifted. With the structure illustrated the roof swings smoothly to the raised position with a minimum of effort and is held by the torsion rods against collapsing, a reasonable but definite pressure being required to start lowering the roof, the pressure decreasing as the weight of the roof effectively moves forward of the pivotal axes of the cross bars 56 and assists the lowering action. Since the interconnection of the support struts holds the roof in good alignment and seated on the base around its entire periphery, a single fastener is sufficient to lock the unit in closed position. This is conveniently located at the forward end where air pressure while in motion might tend to lift the roof. As illustrated in FIGURE 3, a catch 66 is mounted on the inside of inset portion 32 and a lock pin 68 is passed through the front wall 40 to engage the catch. Many different types of fasteners are suitable, such as screw or twist-lock elements, or a luggage type external latch may be used. The ends of anchor bars 64 are secured in stop blocks 69 which are engaged by legs 54 to limit the travel and hold support struts 48 and 50 vertical.

The raised unit is enclosed by a curtain assembly, the forward portion, which remains attached at all times, comprising a front panel 70 and side wings 72 secured between the roof 18 and inset portion 34. Front panel 70 may be fitted with a window 74, and an elastic cord 76, or the like, is stretched between side wings 72 to pull the wings inwardly as the roof is lowered, avoiding the necessity of tucking these portions in.

The sides are enclosed by side panels 78 secured along inset portions 34 and the inside of roof side walls 38, said side panels having screen inserts 80 for ventilation and visibility. If desired, weatherproof cover flaps, not shown, can be provided for screen inserts 80. The rear of each side panel 78 has a downwardly extending flap 82 secured to the rear door pillars 84 of the vehicle. The rear end is enclosed by a rear panel 86 and side flaps 88 secured inside the roof side and rear walls and to the tailgate 14, the forward edges of said side flaps being joined to the rear edges of side panels 78 by full length vertical zippers 90.

Side panels 78, front panel 70 and side wings 72 are secured to the inset portion 34 by screws 92, or the like. All panels except front panel 70 are detachable from the roof 18 and are held in place by manually operable fasteners 94, such as heavy duty snap fasteners, key head fasteners, or similar means. Various types of suitable fasteners have been used for securing boat covers, or tonneau covers for sports cars or pick-up trucks. The flaps 82 are secured to door pillars 84 and the rear panel 86 and side flaps 88 are secured to tailgate 14 by further fasteners 94.

All of the curtain panels may be made from plastic or rubber impregnated fabric, plastic sheet, or similar durable and weather resistant material. Alternatively, the panels could be made from sheet aluminum, suitably hinged for storage. The specific construction of the curtain panels will depend on the material used and the method of fastening.

To make the unit readily adaptable to different vehicle configurations, without the necessity for changing the entire base, the arrangement of FIGURE 7 may be used. The base 96 is provided with a separate lower edge portion comprising an adapter skirt 98, which can be made to fit a specific vehicle, the main base being standardized for a wide variety of vehicles. Adapter skirt 98 can be permanently bonded to the base 96, or detachably held by screws or the like if the sleeper unit is to be transferred from one vehicle to another.

When the unit is closed, the side panels and rear panel assembly are stored on the floor 20, the side panels being left attached to the base 16 and merely detached from the roof to be folded inwardly, as in FIGURE 4. The rear panel assembly is completely detached and suitably folded for storage under the roof 18.

As the roof 18 is raised, the front panel 70 and side wings 72 will automatically be extended and pulled tight, the roof swinging upwardly and rearwardly to extend back over the tailgate. The side panels 78 are then lifted and attached to the roof fasteners 94 and down the door pillars 84. The lowered tailgate provides access to the inside of the sleeper unit, a ladder not being essential as with most roof mounted sleepers. The rear panel and side flaps can be attached to the roof while standing on the tailgate, then secured around the tailgate to complete the enclosure. With zippers 90 closed, the interior of the vehicle and interior of the unit form a double deck closed compartment. Access may be had through the vehicle doors, or to the tailgate by opening either zipper 90. The enclosure is much larger than the usual top mounted sleeper and includes the tailgate platform with full head room, yet does not involve any tent-like portions extending to the ground. While the vehicle would not normally be driven with the sleeper unit erected, it would be possible to do so at limited speed, as in seeking shelter from driving rain, or moving to a more desirable location in the near vicinity. With the vehicle interior and the sleeper unit interconnected, good ventilation and air circulation is ensured and, if needed, the vehicle heater can heat the sleeper unit.

To fold the unit, the detachable panels are unfastened and stored, then the roof is merely pushed forward, the support struts swinging the roof forward and down to seat on the base 16. Front panel 70 drops by its own weight and side wings 72 are pulled in by elastic cord 76 as the roof is lowered, so that the entire operation can be performed easily by one person. There is ample room under the closed roof for a mattress or pad and bedding.

By making base 16 substantially the full size of the vehicle roof and using the peripheral wall for support, the load is carried around the outer perimeter of the roof where the corner contours provide added strength, as opposed to some types of car top units which rest on pads on the unsupported top panel of the roof. While the sleeper unit is primarily for use on a station wagon, in order to utilize the tailgate, it may be used with other types of vehicles, the roof overhang and rear enclosure panels forming a curtained and sheltered rear entry. This arrangement would provide protection from rain and wind and afford privacy for changing clothes.

It is understood that minor variation from the form of the invention disclosed herein may be made without departure from the spirit and scope of the invention, and that the specification and drawings are to be considered as merely illustrative rather than limiting.

I claim:
1. A sleeper unit for a vehicle, comprising:
 a base for attachment to the top of a vehicle having a tailgate;
 a roof portion seating closely on said base in a closed position;
 a plurality of support struts pivotally connecting said base and said roof portion to allow the roof portion to swing upwardly and rearwardly, relative to the vehicle, from the closed position to an open position vertically above said tailgate and a rear portion of said vehicle and curtain panels securable to and between said roof portion and said tailgate to define a compartment at the rear of the vehicle.

2. Apparatus according to claim 1 wherein said struts are interconnected to move in unison;
 bias means coupled to said struts to urge said roof portion to the open position;
 and curtain panels at least partially detachably secured between said base and said roof portion.

3. A sleeper unit according to claim 2 and including stop means in said base engageable with said struts in the open position to limit the travel of the struts.

4. In combination with a vehicle having a rear tailgate extensible to form a platform behind the vehicle, a sleeper unit, comprising:
 a base secured to the top of the vehicle;
 a roof portion seating closely on said base in a closed position;
 a plurality of strut support means interconnecting said base and said roof to swing the roof upwardly and rearwardly to an open position, with the rear of the roof extending over the tailgate;
 and curtain panels at least partially detachably secured between said roof portion and said base, and between the roof portion and the tailgate.

5. The combination according to claim 4 wherein said support means includes a plurality of struts pivotally connected at opposite ends to said base and said roof portion, said struts all being interconnected to move in unison.

6. The combination according to claim 5 and including bias means connected to said struts to urge the roof portion toward the open position.

7. The combination according to claim 4, wherein said base is substantially the full size of the vehicle roof, said base having a peripheral wall engaging the periphery of the vehicle roof and supporting the sleeper unit.

8. The combination according to claim 7 wherein the lower portion of said peripheral wall is an adapter skirt, adapting said base to the contours of the vehicle top.

9. A sleeper unit for a vehicle, comprising:
 a base for attachment to the top of a vehicle;

a roof portion seating closely on said base in a closed position;

a plurality of support struts pivotally connecting said base and said roof portion to allow the roof portion to swing upwardly and rearwardly, relative to the vehicle, from the closed position to an open position;

said struts being interconnected to move in unison;

bias means coupled to said structs to urge said roof portion to the open position;

and curtain panels at least partially detachably secured between said base and said roof portion.

References Cited by the Examiner

UNITED STATES PATENTS

| | | | |
|---|---|---|---|
| 1,984,681 | 12/1934 | Jackson | 135—5 |
| 2,353,820 | 7/1944 | Eddins | 135—5 |
| 3,021,852 | 2/1962 | Hoffman | 135—1 |
| 3,190,689 | 5/1965 | Calthorpe | 296—23 X |

BENJAMIN HERSH, *Primary Examiner.*

P. GOODMAN, *Assistant Examiner.*